(12) United States Patent
Ford

(10) Patent No.: US 6,349,201 B1
(45) Date of Patent: Feb. 19, 2002

(54) BULLET-PROOF VEST WITH DISTRESS SIGNALING SYSTEM

(76) Inventor: Sean Ford, P.O. Box 217, Medford, NJ (US) 08055

(*) Notice: Subject to any disclaimer, the term of this patent is extended or adjusted under 35 U.S.C. 154(b) by 0 days.

(21) Appl. No.: 09/218,582

(22) Filed: Dec. 22, 1998

Related U.S. Application Data

(60) Provisional application No. 60/075,902, filed on Feb. 25, 1998.

(51) Int. Cl.⁷ .................. H04M 11/00; H04B 1/034; H04B 7/00; G08B 23/00; A41D 13/00
(52) U.S. Cl. .................. 455/404; 455/100; 455/66; 340/573.1; 2/455; 2/463
(58) Field of Search ................. 455/100, 404, 455/423, 66; 340/573.1, 605; 600/484; 273/454; 2/455, 102, 463, 464, 905

(56) References Cited

U.S. PATENT DOCUMENTS

| | | | |
|---|---|---|---|
| 3,899,772 A | 8/1975 | Mead et al. ................ 340/152 |
| 4,740,792 A | 4/1988 | Sagey et al. ................ 342/457 |
| 4,807,887 A | 2/1989 | DeVale et al. ............... 273/372 |
| 4,824,107 A | * 4/1989 | French ....................... 273/454 |
| 5,077,831 A | * 12/1991 | Weber ......................... 455/68 |
| 5,274,359 A | 12/1993 | Adams ........................ 340/604 |
| 5,319,355 A | 6/1994 | Russek ........................ 340/573 |
| 5,557,263 A | 9/1996 | Fisher et al. ................ 340/605 |
| 5,565,840 A | 10/1996 | Thorner et al. .......... 340/407.1 |
| 5,636,378 A | 6/1997 | Griffith ......................... 2/455 |
| 5,749,365 A | * 5/1998 | Magill ......................... 600/484 |
| 5,838,237 A | * 11/1998 | Revell et al. ............. 340/573.1 |
| 6,145,551 A | * 11/2000 | Jayaraman et al. ......... 139/387 |

* cited by examiner

Primary Examiner—Dwayne Bost
Assistant Examiner—Raymond Persino
(74) Attorney, Agent, or Firm—Volpe & Koenig, P.C.

(57) ABSTRACT

A garment having at least one layer providing bullet-proof protection for the wearer. One or more additional layers incorporate sensors to detect the magnitude of an impact to generate a signal activating a wireless transmitter to send distress signals and/or positional and other information to a remote base location. Additional sensors may be provided to indicate physical characteristics of the wearer.

22 Claims, 2 Drawing Sheets

BULLET-PROOF VEST WITH DISTRESS SIGNALING SYSTEM

This application claims Provisional of 60/075,902, filed Feb. 25, 1998.

FIELD OF THE INVENTION

The present invention relates to bullet-proof vests and more particularly to such vests having the capability of selectively providing distress and warning signals to remote locations.

BACKGROUND OF THE INVENTION

This invention is related to the field of personal security devices. In particular, the invention is directed to a protective garment, such as a vest, which will not only provide protection against traumas and impacts delivered to the wearer, but will provide a distress signal to a police station or other such authority when the trauma or impact is received.

It is common for police officers and other peace keeping officials to wear protective vests. These vests are made of a bullet proof material and additional shock absorbing material. Kevlar® or other tightly woven, tear resistant material can be employed as the bullet proof material. Rigid plates can also be employed but due to their added weight and discomfort, they are less common. Padding, including inflatable chambers or compressible fill, can be used within the bullet proof liner to distribute the force of stopping the bullet over a larger area on the wearer's body.

Although these vest are often successful at preventing or reducing the wearer's injuries, they are not perfectly effective. Some bullets can pass through a protective vest, entering the body of the wearer. Other weapons deliver a spray of pellets (such as a shotgun) which may not be completely blocked by the vest. Further, even when the bullet does not pass completely through, the impact from stopping the bullet can be substantial, causing severe, even deadly injury to the wearer.

Once the wearer has been injured, he may be unable to request aid. This is of particular concern for police officers who may be on a deserted road at night during a traffic stop, or who may be called off their regular beat in an emergency situation. Once so severely injured, the locations of these officers may be unknown. Consequently, although the vest may reduce injury, the officer is still at great risk and not easily located to receive aid even if it is known that the officer is injured. While such officers typically carry radios, if the officer is unconscious or delirious, he may not be able to instruct anyone as to his location.

The problems arising in these situations are not even recognized in the prior art, let alone resolved. U.S. Pat. No. 5,636,378 is directed to an impact sensing vest and issued on Jul. 10, 1997 from a patent filed Jun. 8, 1995. This patent discloses a vest including woven tubing incorporated throughout the vest. An electrically conductive fluid passes through the tubing. An electrical signal is passed through the tubes at all times. Should the vest be subjected to a substantial impact, the tubing would break, thereby short circuiting the current passing through the tubes. When the electrical contact is broken, the transmitter is activated and sends a recorded message, such as an identification number of the wearer, to a central dispatcher. The transmitter can also be activated when a position sensor detects that the vest is in a vertical position for a predetermined period of time. A rip-cord can be provided which allows the wearer to instantly activate the transmitter in times of distress. There is no suggestion to employ this system with a bullet proof vest.

U.S. Pat. No. 5,319,355 is directed to an alarm for patient monitor and life support equipment system. This patent issued on Jun. 7, 1994 from a patent application originally filed on Mar. 6, 1991. In the disclosed system, medical and hospital personal are notified that a patient's life support equipment require an immediate response. As preferred this system generates an alarm signal indicating the patient and the particular equipment which needs attention. This signal is sent to a master control unit which then transmits the signal to pagers held by the doctors and other personnel. Preferably, the pager has a vibrational announcer and a visual display which can describe the patient location and the equipment which needs attention. In this way, the medical personnel can be notified without alarming the patient. Again, there is no teaching to use this system with a bullet proof vest or with an impact sensing device.

U.S. Pat. No. 5,274,359 is directed to a portable water activated alert system with directional indicator. This patent issued on Dec. 28, 1993 from an application filed Mar. 9, 1992. In this system, a device is provided which incorporates a signal transmitter activated by water. Such a device could be warn by a child playing near a pool. Should the device become wet, the transmitter sends a signal to a receiver. The receiver is operably engaged to an alarm. The receiver also is attached to a directional and proximity indicator which lights up LEDs indicating the distance and location of the transmitter.

U.S. Pat. No. 4,740,792 is directed to a vehicle location system. This patent discloses generally the use of one type of global positioning system.

None of these patents address the problems resolved by the instant invention.

SUMMARY OF INVENTION

It is an object of the present invention to provide a bullet proof vest which will signal a central station when the wearer is subjected to a substantial impact, such as from a bullet.

It is another object of an aspect of the invention to provide a bullet proof vest which will perceive the location of the wearer and will forward the location to the central station when the wearer has received a substantial impact.

It is another object of the invention to provide a vest which will distribute the impact of a trauma over a large portion of the wearer's body, will signal a central station that the impact has been delivered, and will identify the wearer and his location.

It is another object of an aspect of this invention to provide a vest which can reduce the effect of an impact on the wearer while monitoring the wearer's bodily functions. Should the wearer be subjected to an impact or should the bodily functions move beyond a predetermined range, a transmitter will send a distress signal to a central station identifying the wearer and his location.

It is another object of the invention to provide a garment which is bullet proof that includes a sensor for determining when a substantial impact has been delivered to the garment and a transmitter for sending a signal that the substantial impact has been received.

In accord with one aspect of the invention, an apparatus for protecting a user from severe impact and warning of the severe impact is provided. A vest has an outer sensing layer, an inner sensing layer and a central layer disposed between the inner sensing layer and the outer sensing layer. The inner sensing layer and the outer sensing layer are adapted to send an impact signal when they are subjected to an impact above a predetermined level. A transmitter is adapted to broadcast a warning or distress signal when an impact signal is generated. A global positioning device of determining the location of the vest generates a signal corresponding to that location. Means are also provided for actuating the global positioning device to transmit the location signal when an impact signal is generated.

In accord with another aspect of the invention, a garment is disclosed for providing a warning when a user is subjected to an impact. Preferably, the garment is a vest having a protective layer and a sensing layer disposed adjacent to the protective layer. The sensing layer is adapted to send an impact signal when subjected to an impact above a predetermined level. The vest also includes a transmitter operably engaged to the sensing layer for sending a distress signal when an impact signal is generated. A global positioning device is attached to the vest. The distress signal includes information corresponding to the location of the user.

Certain implementations of this aspect of the invention provide that: physiological sensors are attached to the vest and are operably engaged to the wearer for generating physiological signals corresponding to selected physical conditions of the user; the distress signal includes information corresponding to the physiological signals; the physiological sensor is a thermometer for measuring the body temperature of the user and the distress signal includes information about the body temperature of the user; the physiological sensor is a blood pressure meter for measuring the blood pressure of the user and the distress signal includes,information about the blood pressure of the user; the pressure layer is made of a piezoelectric material; the sensing layer is a first sensing layer, the vest further comprising a second sensing layer attached to the protective layer opposite the first sensing layer; the distress signal varies on whether the first sensing layer sends an impact signal, whether the second impact layer sends an impact signal, or whether both sensing layers send impact signals; the impact signal varies depending upon the strength of the impact.

In accord with another aspect of the invention, a garment is provided. A first layer includes a means for sensing an impact on the first layer. Means are provided for generating an impact signal based on the impact on the first layer. Means are also provided for transmitting a distress signal based upon the impact signal. A second layer is attached to the first layer and is designed to resist impact.

Certain implementations of this aspect of the invention provide that: the second layer is bullet proof; the first layer is composed of a piezoelectric material; the signal generated by the impact sensing means corresponds to the strength of the impact; a third layer is attached to the second layer and a second impact sensing means is operably engaged to the third layer for detecting impact on the third layer, wherein the signal generated by the impact sensing means is based, at least in part, on the impact sensed by the second impact sensing means.

In accord with another aspect of the invention, a garment is provided for protecting a wearer from impact blows and for emitting a distress signal upon delivery of the impact blow. The garment is a vest having a bullet proof liner and a cover layer attached to the bullet proof liner. Means are provided for sensing impact on the cover layer and for generating an impact signal. Means are also provided for sending a distress signal attached to the vest. The distress signal sending means includes a means for generating and transmitting a broadcast signal based, at least in part, on the impact signal, which broadcast signal includes information concerning the wearer.

Certain implementations of this aspect of the invention provide that: the broadcast signal is a radio signal; a global positioning device is mounted to the vest wherein the broadcast signal includes information concerning the location of the wearer; a physiological meter is attached to the vest and operably engaged to the wearer for measuring at least one physical characteristic of the wearer wherein the broadcast signal includes information regarding the at least one physical characteristic; an inner liner is attached to the bulletproof liner opposite the cover layer, a means is provided for sensing an impact on the inner liner, and means are provided for generating a second impact signal corresponding to the impact on the inner liner, wherein the distress signal includes information regarding the second impact signal; a means is provided for sending a status signal attached to the vest for the wearer to broadcast a selected message; the selected message includes information that the wearer is not in danger; a means is provided for locking the status signal means to prevent activating the status signal means without authority.

DESCRIPTION OF PREFERRED EMBODIMENTS

Figure 1:
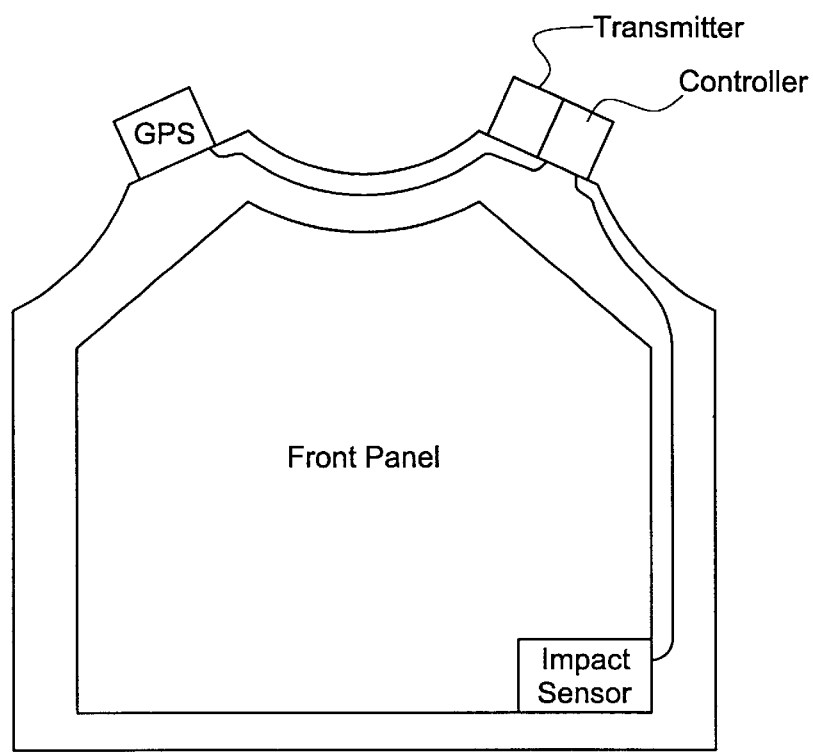
FIG. 1 is a front view of a garment in accord with one aspect of the invention.
Figure 2:
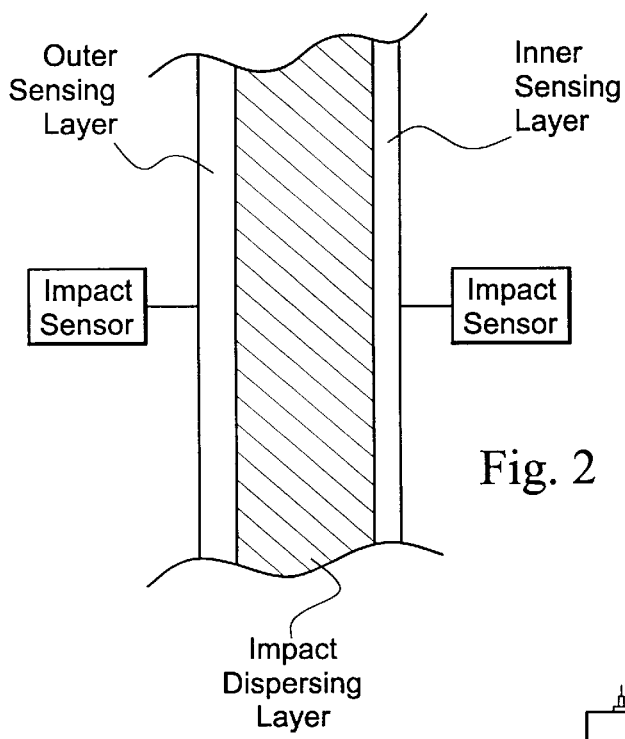
FIG. 2 is a cut-away side view of the garment in FIG. 1.

Referring to FIG. 1, the instant invention relates to a garment. The garment can have any shape but is currently preferred to be a vest. One skilled in the art will appreciate that the invention can be implemented in a coat, bid, pants, cape, shield, etc., and still practice the invention. The vest has a front panel and a rear panel connected by a yoke. Straps can be employed to secure the front panels and the rear panels in place on the wearer's body. Of course, leg panels and the like can be provided to cover more of the wearer's body, if desired.

Each panel of the garment preferably has three layers. These layers can be distinct and simply attached together. Alternatively, these layers can be integrally formed or covered with a washable sleeve. The first or outer layer of the garment is a pressure sensing layer. As currently preferred, the pressure sensing layer may be made of a piezoelectric material. As such, when the material is subjected to an impact, it will provide a current, or "impact signal" which indicates that an impact was delivered. The pressure sensing layer can be composed of several distinct plates of piezoelectric material such that the location of the impact can be detected with more particularity. Of course, various other methods can be employed to detect impact on the pressure sensing layer. For example, a weave of conductive, fluid-carrying tubes can be employed as taught in U.S. Pat. No. 5,636,378, incorporated herein by reference.

Attached on the inner surface of the outer sensing layer is an impact dispersing layer. This layer is preferably bullet proof. As such, it can be composed of a Kevlar® material, or other such impact resistant material. A padding, such as a soft compressible filler or air-filled chambers (such as in a flack jacket) can be employed in combination with the impact resistant material to form the impact dispersing layer. It will be appreciated that other, impact dispersing structures, such as those currently used in traditional bullet proof vests, and the like, can be employed and still practice the invention.

An inner impact sensing layer can be provided along the inner surface of the impact dispersing layer. Again, this layer may be made of a piezoelectric material and may be separated in several distinct panels. The sensing layers include a sensor or other means for detecting when an impact has been delivered to the panel. This impact detecting device may also determine the level or degree of the impact. An impact signal is generated corresponding to the existence of the impact and, when appropriate, the degree of the impact. Separate impact signals are generated for the outer sensing layer and the inner sensing layer.

Figure 3:
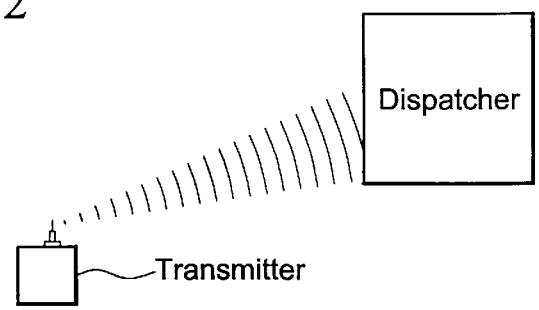
FIG. 3 is a schematic view showing a transmitter and receiver for use with the garment of FIG. 1.
Figure 4:
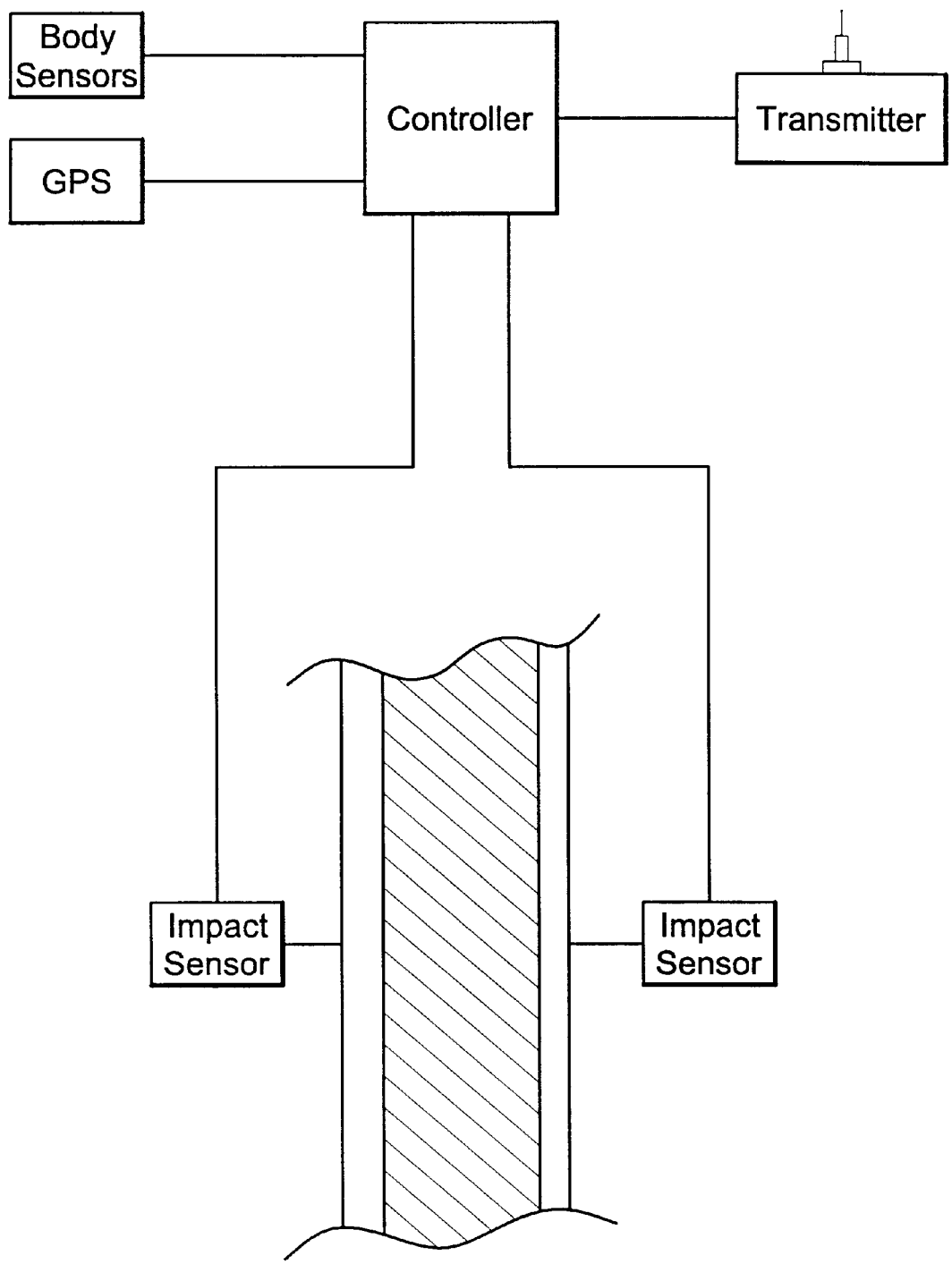
FIG. 4 is a schematic view of the distress signal warning system of an aspect of the instant invention.

Referring to FIG. 4, the impact sensors send the impact signal to a controller. The controller then sends a control signal to a transmitter mounted to the vest (see also FIG. 1). The transmitter then sends a distress signal to the dispatcher or other receiver (see FIG. 3). The transmitter is preferably a radio but other transmitters (such as infrared transmitters) can be employed and practice the invention. The distress signal may include information regarding the strength of the impact, the location of the impact on the vest, whether the impact was delivered to the outer sensing layer, the inner sensing layer or both, and any other information regarding the impact that is believed important to measure and transmit.

Physiological sensors can be attached to the vest and operably engaged to the body of the wearer to detect the physiological conditions of the wearer. For example, a thermometer, a heart beat monitor and blood pressure sensor can detect the temperature, heart rate and blood pressure of the wearer. These devices send a body condition signal to the controller corresponding to the heart rate and the blood pressure. This data can be stored in the controller. Further, this data can be transmitted with the distress signal, apprising the dispatcher of the current physiological state of the wearer. Of course, any acceptably physiological sensors can be employed and practice the invention. Alarms and other sensors can be employed, as taught in U.S. Pat. Nos. 5,557,263 and 5,319,355, incorporated herein by reference. It will be appreciated that other body conditions, such as skin surface moisture and breathing rate can also be measured and included in the body condition signal.

The body condition signals can also be monitored by the controller to determine whether they fall within a predetermined range. When the body condition signals vary beyond the predetermined ranges, the controller can signal the transmitter which, in turn, will send a distress signal. As a result, should the wearer undergo under physical stress, even without an impact, the dispatcher can be warned, sending assistance if it is deemed necessary.

A global positioning device, such as those currently commercially available, is attached to the vest (see FIG. 1). This device sends a location signal to the controller. Again, the location signal can be recorded in the controller and incorporated into the distress signal. As a result, the dispatcher can be informed of the location of the wearer when the distress signal is sent. Any commercially available global positioning device, see U.S. Pat. No. 4,740,792, incorporated herein by reference, or even a local positioning device, see U.S. Pat. No. 5,274,359, incorporated herein by reference, may be employed and practice the invention.

The controller may be provided with information concerning the route of the wearer. Should the wearer vary from the route by a predetermined amount, or for a predetermined time, a distress signal can be sent, indicating the location of the wearer and the length of time outside the predetermined route.

The distress signal may include information identifying the wearer. Further, a communication device, such as a two-way radio or cellular phone can be supplied to the wearer, either mounted to the vest or distinct from the vest. When the dispatcher receives a distress signal, he can attempt to contact the wearer on the communication device. When the wearer is not in fact in need of assistance, the wearer can so inform the dispatcher, thereby preventing the unnecessary use of relief aids. This communication device can also be a simple radio frequency transmitter which can be activated to send a status signal to the dispatcher that the wearer is okay. A lock, such as one requiring a password input may be provided to prevent the unauthorized activation of the status signal sending device.

It will be appreciated that other sensors, such as tilt sensors or temperature sensors can be employed attached to the controller. Consequently, when the wearer is in a dangerous position, such as lying horizontally for an extended period of time or in extreme heat, the controller can cause the transmitter to send a distress signal relaying this information to the dispatcher.

Once the distress signal is sent, it may be repeatedly broadcast at set intervals until it is deactivated. Consequently, the current status of the wearer, as well as his present location, is constantly updated to the dispatcher until help arrives.

While this invention has been described with reference to specific embodiments disclosed herein, it is not confined to the details set forth and the patent is intended to include modifications and changes which may come within and extend from the following claims.

What is claimed is:

1. An apparatus for protecting a user from severe impact and identifying of, the severe impact, the apparatus comprising: a vest having an outer sensing layer, an inner sensing layer and a central layer disposed between the inner sensing layer and the outer sensing layer;

wherein the inner sensing layer and the outer sensing layer respectively initiate an impact signal and a penetration signal when they are respectively subjected to an impact above a predetermined level;

a transmitter adapted to broadcast a signal notifying that at least one of an impact signal and a penetration signal is generated;

a global positioning device for determining the location of the apparatus and generating a signal corresponding to that location; and means for actuating the global positioning device to transmit the location signal when one of said impact signal and said penetration signal is generated.

2. A garment for providing a signal notifying that a user is subjected to an impact comprising:

a vest, having:
    an outer protective layer;
    an inner sensing layer disposed adjacent to the protective layer, which sensing layer is adapted to send an impact signal when subjected to an impact above a predetermined level and indicating that the protective layer has been penetrated; and a transmitter operably engaged to the sensing layer for sending a signal notifying when an impact signal is generated; and a global positioning device attached to the vest; wherein the notifying signal includes information corresponding to a location of the user.

3. The garment of claim 2 wherein the impact signal varies depending upon the strength of the impact.

4. The garment of claim 2 further comprising physiological sensors being attached to the vest and operably engaged to the user for generating physiological signals corresponding to selected physical conditions of the user.

5. The garment of claim 4 wherein the sensors are made of a piezoelectric material.

6. The garment of claim 4 wherein the notifying signal includes information corresponding to the physiological signals.

7. The garment of claim 6 wherein the physiological sensor is a thermometer for measuring the body temperature of the user and the notifying signal includes information about the body temperature of the user.

8. The garment of claim 6 wherein the physiological sensor is a blood pressure meter for measuring blood pressure of the user and the notifying signal includes information about the blood pressure of the user.

9. A garment for providing a signal notifying that a user is subjected to an impact comprising:
a vest, having:
an outer protective layer;
an inner sensing layer disposed adjacent to the protective layer, which sensing layer is adapted to send an impact signal when subjected to an impact above a predetermined level and indicating that the protective layer has been penetrated; and
a transmitter operably engaged to the sensing layer for sending a signal notifying when an impact signal is generated;
a global positioning device attached to the vest; wherein the notifying signal includes information corresponding to the location of the user;
physiological sensors being attached to the vest and operably engaged to the user for generating physiological signals corresponding to selected physical conditions or the user; and
said sensing layer is a first sensing layer, further comprising a second sensing layer attached to the protective layer opposite the first sensing layer.

10. The garment of claim 9 wherein the notifying signal varies on whether the first sensing layer sends an impact signal, whether the second impact layer sends an impact signal, or whether both sensing layers send impact signals.

11. A garment comprising:
a first outer layer including a means for sensing an impact on the first layer;
means for generating an impact signal based on an impact of at least a given value on the first layer;
means for transmitting a notifying signal based upon the impact signal; and
a second inner-layer designed to resist impact, the second layer being attached to the first layer; and
means for normally preventing said means for transmitting to transmit a notifying signal being responsive to a password to enable transmission of the notifying signal upon entry of a password after occurrence of an impact.

12. The garment of claim 11 wherein the second layer is comprised of a bulletproof material.

13. The garment of claim 11 wherein the first layer is composed of a piezoelectric material.

14. The garment of claim 11 wherein the signal generated by the impact sensing means corresponds to a strength of the impact.

15. The garment of claim 11 further including tilt sensor means for generating a signal to indicate an orientation of the garment.

16. A garment comprising:
a first outer layer including a means for sensing an impact on the first layer;
means for generating an impact signal based on an impact of at least a given value on the first layer;
means for transmitting a notifying signal based upon the impact signal; and
a second inner-layer designed to resist impact, the second layer being attached to the first layer;
the signal generated by the impact sensing means corresponding to a strength of the impact; and
further comprising a third layer attached to the second layer and a second impact sensing means operably engaged to the third layer for detecting an impact on the third layer, wherein the signal generated by the impact sensing means is based, at least in part, on the impact sensed by the second impact sensing means.

17. A garment for protecting a wearer from impact blows and for emitting a notifying signal upon delivery of the impact blow comprising:
a vest having:
a bullet proof liner; and
a cover layer attached to the bullet proof liner; and
means for sensing an impact on the cover layer and for generating an impact signal; and
means for sending a notifying signal attached to the vest and having:
means for generating and transmitting a broadcast signal based, at least in part, on the impact signal, which broadcast signal includes information relating to the wearer; and
further comprising an inner liner attached to the bullet proof liner opposite the cover layer, a means for sensing an impact on the inner liner, means for generating a second impact signal corresponding to the impact on the inner liner, wherein the notifying signal includes information regarding the second impact signal.

18. A garment for protecting a wearer from impact blows and for emitting a notifying signal upon delivery of the impact blow comprising:
a vest having:
a bullet proof liner; and
a cover layer attached to the bullet proof liner; and
means for sensing an impact on the cover layer and for generating an impact signal;
means for sending a notifying signal attached to the vest and having:
means for generating and transmitting a broadcast signal based, at least in part, on the impact signal, which broadcast signal includes information relating to the wearer; and
wherein the selected message includes information that the wearer is not in danger; and further comprising a means for preventing the notifying signal means from sending a notifying signal and responsive to a password applied after an impact to enable transmission of a notifying signal.

19. The garment of claim 18 further including tilt sensor means for generating a signal to indicate an orientation of the garment.

20. In combination, a wearable apparatus for protecting a user from a severe impact and identifying the severe impact and a remote monitor station, the monitor station having a receiver and a transmitter;

the wearable apparatus comprising: a vest having an outer sensing layer, an inner sensing layer and a central layer disposed between the inner sensing layer and the outer sensing layer;

wherein the inner sensing layer and the outer sensing layer respectively initiate an impact signal and a penetration signal when they are respectively subjected to an impact above respective predetermined levels;

a transmitter adapted to broadcast a signal notifying that at least one of an impact signal and a penetration signal is generated;

a global positioning device for determining the location of the apparatus and generating a signal corresponding to that location; and means for actuating the global positioning device to transmit the location signal when one of said impact signal and said penetration signal is generated;

said monitor station receiver receiving said notifying signal;

said monitor station transmitter transmitting a status inquiry signal to a wearer of the vest responsive to a notifying signal received by said monitor station receiver.

21. The combination of claim 20 further comprising a separate user transmitter enabling the user of the wearable apparatus to transmit a response to the status inquiry.

22. The garment of claim 21 further comprising means for normally preventing the separate transmitter to operate being responsive to a password to enable transmission of the notifying signal by the separate transmitter.

* * * * *